United States Patent
Volpe et al.

(10) Patent No.: US 7,885,195 B2
(45) Date of Patent: Feb. 8, 2011

(54) TEST SYSTEM WITH USER SELECTABLE CHANNEL

(75) Inventors: Brady Volpe, Alpharetta, GA (US); Matt DuBose, Atlanta, GA (US); Marco Laburada, Duluth, GA (US)

(73) Assignee: Sunrise Telecom Incorporated, San Jose, CA (US)

( * ) Notice: Subject to any disclaimer, the term of this patent is extended or adjusted under 35 U.S.C. 154(b) by 178 days.

(21) Appl. No.: 12/037,672

(22) Filed: Feb. 26, 2008

(65) Prior Publication Data
US 2009/0213738 A1    Aug. 27, 2009

(51) Int. Cl.
*H04L 1/00* (2006.01)

(52) U.S. Cl. .................. 370/244; 370/242; 379/1.04; 379/21; 725/107

(58) Field of Classification Search .......... None
See application file for complete search history.

(56) References Cited

U.S. PATENT DOCUMENTS

| | | | |
|---|---|---|---|
| 6,230,326 B1 | 5/2001 | Unger et al. | |
| 6,704,288 B1 | 3/2004 | Dziekan et al. | |
| 6,728,887 B1 | 4/2004 | Dziekan et al. | |
| 6,853,932 B1* | 2/2005 | Wichelman et al. | 702/76 |
| 6,985,437 B1* | 1/2006 | Vogel | 370/230 |
| 7,088,733 B1* | 8/2006 | Rowe | 370/437 |
| 7,111,318 B2* | 9/2006 | Vitale et al. | 725/107 |
| 7,246,368 B1* | 7/2007 | Millet et al. | 725/111 |
| 7,451,472 B2* | 11/2008 | Williams | 725/107 |
| 7,584,496 B2* | 9/2009 | Zinevitch | 725/107 |
| 2002/0062486 A1 | 5/2002 | Park | |
| 2004/0037217 A1 | 2/2004 | Danzig et al. | |
| 2004/0190544 A1 | 9/2004 | Azenko et al. | |
| 2005/0047442 A1 | 3/2005 | Volpe et al. | |
| 2006/0048200 A1* | 3/2006 | Jaworski et al. | 725/107 |
| 2006/0100815 A1 | 5/2006 | Wheeler et al. | |
| 2007/0223512 A1* | 9/2007 | Cooper et al. | 370/437 |
| 2008/0298270 A1* | 12/2008 | Chappell et al. | 370/252 |

* cited by examiner

*Primary Examiner*—Donald L Mills
(74) *Attorney, Agent, or Firm*—Mikio Ishimaru

(57) ABSTRACT

A test system comprising: acquiring an upstream channel descriptor list; entering a pause network state when the upstream channel descriptor list is completed; and selecting a particular channel from the upstream channel descriptor list before exiting the pause network state.

20 Claims, 3 Drawing Sheets

TEST SYSTEM WITH USER SELECTABLE CHANNEL

TECHNICAL FIELD

The present invention relates generally to communication testers, and more particularly to a system for testing a Data Over Cable Service Interface Specification (DOCSIS) network.

BACKGROUND ART

Today people demand connectivity to services from all over the world without leaving their homes. They want video on demand, Internet access, live on-line gaming, and access to the world market place from the comfort of their living room. In order to support these ideas and requests a cable industry group developed the Data Over Cable Service Interface Specification (DOCSIS). DOCSIS defines a procedure for transferring digital information through the existing cable television infrastructure.

DOCSIS specifies downstream traffic transfer rates between 27 and 36 mega bits per second (Mbps) over a radio frequency (RF) path in the 50 mega hertz (MHz) to 750+ MHz range, and upstream traffic transfer rates between 320 kilo bits per second (Kbps) and 10 Mbps over a RF path between 5 and 42 MHz. But, because data over cable travels on a shared loop, individuals will see transfer rates drop as more users gain access. New proposals for the DOCSIS 3.0 specification may support transfer rates up to 160 Mbps in the downstream direction and 120 Mbps in the upstream direction in order to extend the useful life of the cable television (CATV) infrastructure.

In order to facilitate these transfer rates, the condition of the cable structure and its proper termination is critical. Many signal processing techniques, Time Division Multiple Access (TDMA), Quadrature Amplitude Modulation (QAM), Quadrature Phase Shift Keying (QPSK), Trellis Coded Modulation (TCM) and the like are used to extend the capabilities of the aging CATV structure.

A critical aspect of the DOCSIS operation requires maintaining the integrity of the cable structure itself. In order to maintain the operational integrity of the cable structure, sophisticated test and analysis equipment must be used to detect and resolve problems. By coupling specific test equipment to the cable test points, signals between the Cable Modem Termination System (CMTS) and the Cable Modem (CM) may be analyzed.

The downstream path, from the CMTS to the CM, is critical to analyze because the CMTS manages the transmission of data content into the cable structure. Power and phase of the transmission signals have already been adjusted to compensate for losses prior to the CMTS. In the structure beyond the CMTS there may be many branches or CM attach points that can affect the signal quality. Each node in the cable structure may require different signal processing and amplification in order to deliver good data to the end user. The analysis of the delivery path is crucial to the efficient delivery of transmitted data. A network monitor may capture and examine the signal for abnormalities in amplitude, phase, or modulation, but is limited to active device analysis.

In order to analyze the downstream path, from the CMTS to the CM, the test equipment must perform the testing without disrupting the active flow of data to the CMs. The DOCSIS protocol provides for a device to become connected and recognized on the network on a first available channel basis. If a device had previously been active on the network, the protocol attempts to re-attach the device on the same channel that previously provided a satisfactory transfer.

The tendency of the DOCSIS protocol to restore a device to the last known working channel makes it difficult for a test device to verify more than a single channel that isn't actively transferring data to an end user's CM. The current methodology actively monitors the data traffic on subscribed channels, without any proactive testing of the available unused channels in the network.

Thus, a need still remains for a test system with user selectable channels for simplifying the analysis of the downstream path in the cable structure. In view of the overwhelming popularity high-speed content delivered to the home, it is increasingly critical that answers be found to these problems. In view of the ever-increasing commercial competitive pressures, along with growing consumer expectations and the diminishing opportunities for meaningful product differentiation in the marketplace, it is critical that answers be found for these problems. Additionally, the need to save costs, improve efficiencies and performance, and meet competitive pressures, adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a test system including: acquiring an upstream channel descriptor list; entering a pause network state when the upstream channel descriptor list is completed; and selecting a particular channel from the upstream channel descriptor list before exiting the pause network state.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
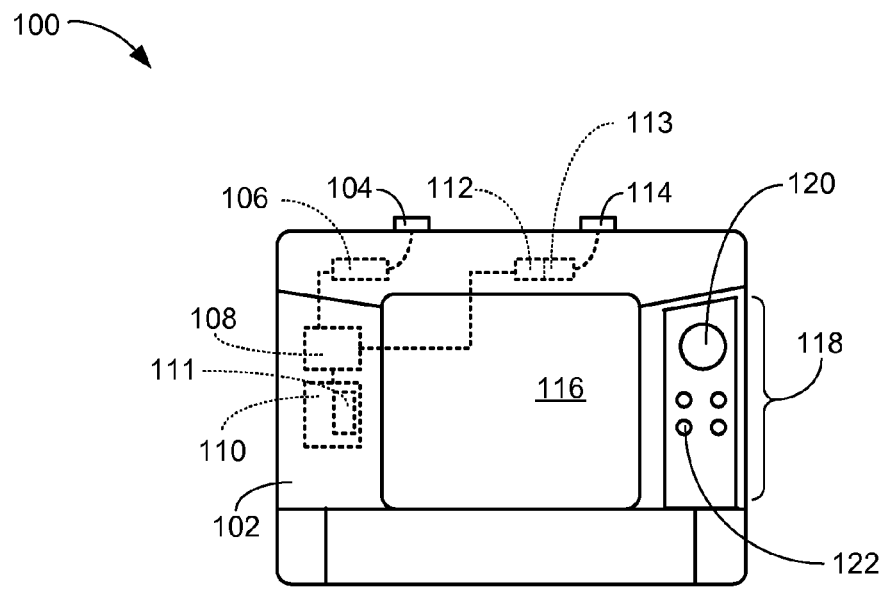
FIG. 1 is a plan view of a test system with user selectable channel, in an embodiment of the present invention.

The following embodiments are described in sufficient detail to enable those skilled in the art to make and use the invention. It is to be understood that other embodiments would be evident based on the present disclosure, and that process or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail. Likewise, the drawings showing embodiments of the system are semi-diagrammatic and not to scale and, particularly, some of the dimensions are for the clarity of presentation and are shown greatly exaggerated in the drawing FIGs. Where multiple embodiments are disclosed and described, having some features in common, for clarity and ease of illustration, description, and comprehension thereof, similar and like features one to another will ordinarily be described with like reference numerals.

For expository purposes, the term "horizontal" as used herein is defined as a plane parallel to the plane or surface of the Earth, regardless of its orientation. The term "vertical" refers to a direction perpendicular to the horizontal as just defined. Terms, such as "above", "below", "bottom", "top", "side" (as in "sidewall"), "higher", "lower", "upper", "over", and "under", are defined with respect to the horizontal plane. The term "on" means there is direct contact among elements. The term "system" as used herein means and refers to the method and to the apparatus of the present invention in accordance with the context in which the term is used.

Referring now to FIG. 1, therein is shown a plan view of a test system with user selectable channel 100, in an embodiment of the present invention. The plan view of the test system with user selectable channel 100 depicts a controller unit 102, such as a tester controller unit, having a radio frequency (RF) input jack 104 mounted thereon. The RF input jack 104 is coupled to an RF receiver 106, which may be controlled by a conditioning circuit 108, such as a field programmable integrated circuit, an application specific integrated circuit or a micro processor. A storage device 110, such as a memory or disk storage device, may be coupled to the conditioning circuit 108 for storing network messages, diagnostic data, set-up parameters, default parameters, or a combination thereof. An upstream channel descriptor (UCD) list 111 may be formed within the storage device 110 for capturing an upstream data channel information.

The conditioning circuit 108 may also be coupled to an RF transmitter 112, having a transmission power limiter 113, which is coupled to an RF output jack 114. A control panel 118 may be used to activate the functions of the test system with user selectable channel 100. The control panel 118 may include a positioning button 120 and a selection button 122. A display screen 116 may be used to present the diagnostic data, set-up information, or status.

The control panel 118 as shown in FIG. 1 is by way of an example only. The positioning button 120 may be replaced by activating a touch screen for positioning a selection on the display screen 116. The selection button 122 is by way of an example also. It may be any button on the control panel 118 or it may be a soft key defined on the display screen 116.

The test system with user selectable channel 100 may be used to analyze a data over cable service interface specification (DOCSIS) network. It may be used to maintain the DOCSIS network by detecting problem interconnects. Problems such as damaged cables, high ingress levels, loose connectors, or corroded contacts may severely restrict the communication bandwidth of the DOCSIS network.

Figure 2:
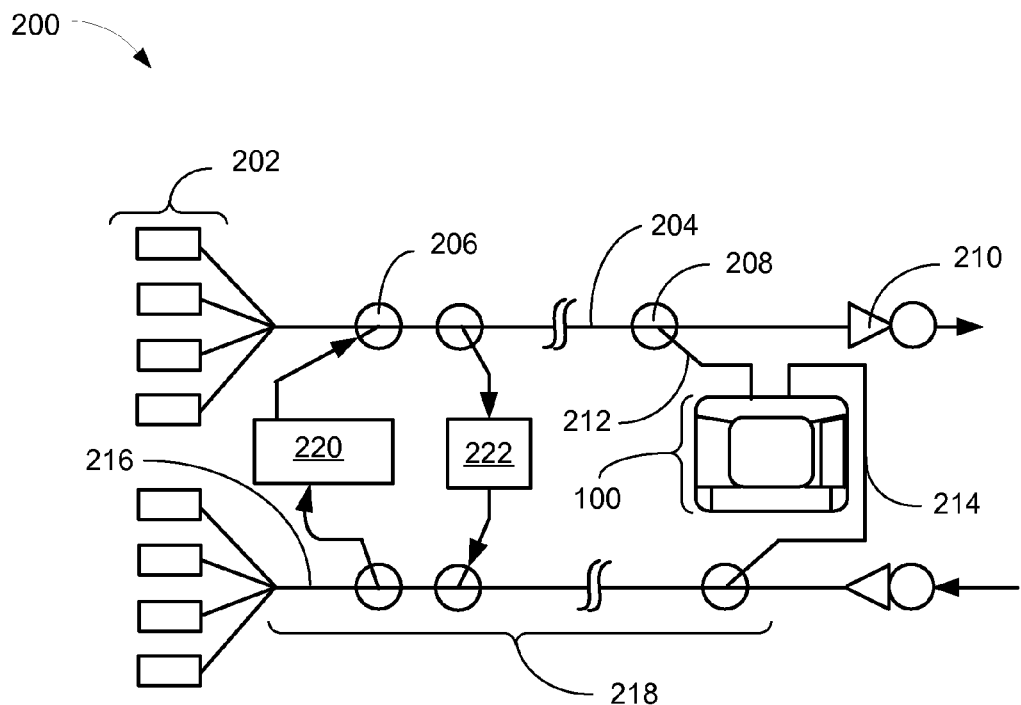
FIG. 2 is a functional block diagram of a network having the test system with user selectable channel, in an embodiment of the present invention.

Referring now to FIG. 2, therein is shown a functional block diagram of a network 200 having the test system with user selectable channel 100, in an embodiment of the present invention. The functional block diagram of the network 200 depicts a cable modem termination system (CMTS) 202 couples to a downstream cable 204. The downstream cable 204 may have a test coupling 206 or a number of a cable modem (CM) attach point 208 distributed along its length. A downstream buffer 210 may be used to boost signal levels or convert the signals to an optical protocol for longer distance distribution.

The test system with user selectable channel 100 may be coupled to the test coupling 206 or the cable modem (CM) attach point 208 for analyzing the network 200. A radio frequency (RF) input cable 212 may be used to couple the test system with user selectable channel 100 to the downstream cable 204. An RF output cable 214 may couple the test system with user selectable channel 100 to an upstream cable 216 through the test coupling 206 or the cable modem (CM) attach point 208. The test couplings 206 and the cable modem attach points 208 are distributed on the downstream cable 204 and the upstream cable 216 at equivalent locations. That is to say, the distance from the cable modem termination system 202 to each of the test coupling 206 or the cable modem (CM) attach point 208 is the same on the downstream cable 204 and the upstream cable 216. Any difference in the transmission characteristics may be the result of damaged cables, loose connectors, corrosion, failed components, or a combination thereof.

The analysis of these problems must occur during the normal operation of the network 200. Downstream frequency sweeps may collect information about noise sources in the path from the cable modem termination system 202 to the cable modem attach point 208. This is the primary data payload delivery path. Just as important to peak performance of the network 200 is a return path 218, such as the upstream cable 216 between the cable modem attach point 208 and the cable modem termination system 202 including any of the test coupling 206 or the cable modem (CM) attach point 208. The return path 218 typically handles smaller payloads, such as requests for data, maintenance requests, or initialization exchanges.

A head end tester 220 may be coupled between the downstream cable 204 and the upstream cable 216. The head end tester 220 may receive a return sweep, such as a frequency sweep, from the test system with user selectable channel 100 across the return path 218. The head end tester 220 may assemble the return sweep results in a graphical representation for sending the results on the downstream cable 204. An interface device 222, such as a cable modem or a cable branch amplifier, may be attached to the downstream cable 204 and the upstream cable 216 at the cable modem attach point 208.

The representation of the network 200 is by way of an example of the function only. In actual implementation the apparatus may be different.

Figure 3:
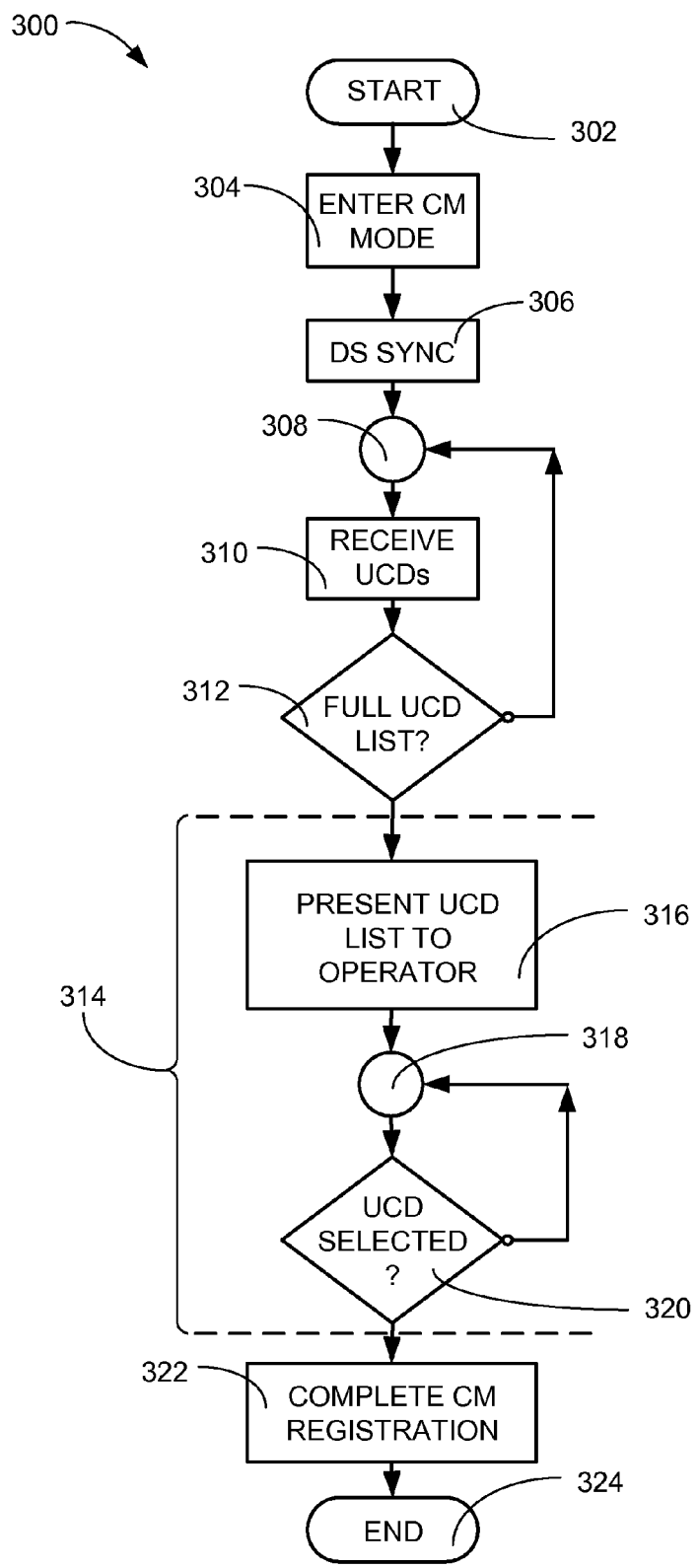
FIG. 3 is a flow diagram of a user channel selection process, in an embodiment of the present invention.

Referring now to FIG. 3, therein is shown a flow diagram of a user channel selection process 300, in an embodiment of the present invention. The flow diagram of the user channel selection process 300 depicts a sequence start block 302, in which the controller unit 102 of FIG. 1 may emulate the interface device 222 of FIG. 2, coupled to an enter CM mode block 304. The enter CM mode block 304 starts a communication sequence between the test system with user selectable channel 100, of FIG. 1, and the cable modem termination system (CMTS) 202, of FIG. 2. The communication sequence is a ranging sequence that may be used to initiate transactions on the network 200, of FIG. 2. In order to properly communicate on the network 200, the flow enters a data stream synchronization state 306. The data stream synchronization state 306 may adjust the receiver 106, of FIG. 1, to recognize an upstream channel descriptor (UCD) message from the cable modem termination system (CMTS) 202.

The user channel selection process 300 then transitions through a first return point 308 to enter a receive UCD state 310. In the receive UCD state 310, the receiver 106 recognizes the upstream channel descriptor (UCD) message from the cable modem termination system (CMTS) 202. The conditioning circuit 108, of FIG. 1, may capture the upstream channel descriptor (UCD) message and store the upstream data channel information in the upstream channel descriptor (UCD) list 111, of FIG. 1. The flow then enters a complete UCD list verification 312. If the upstream channel descriptor (UCD) list 111 does not contain a complete list of the available upstream data channels, the flow returns to the first return point 308 to acquire more of the upstream channel descriptor (UCD) message.

If the complete UCD list verification 312 does indicate that the upstream channel descriptor (UCD) list 111 does contain a complete list of the available upstream data channels, the flow may enter a pause the network state 314. The pause the network state 314 will delay any further interaction with the cable modem termination system (CMTS) 202 pending operator intervention. In this state, the cable modem termination system (CMTS) 202 continues interacting with other of the interface devices 222, of FIG. 2, that may be active.

Within the pause the network state 314 the flow enters a present UCD list state 316. In the present UCD list state 316, the contents of the upstream channel descriptor (UCD) list 111 may be listed on the display screen 116, of FIG. 1. An operator (not shown) may utilize the control panel 118, of FIG. 1, to select a particular channel from the upstream channel descriptor (UCD) list 111 for testing. When the contents of the upstream channel descriptor (UCD) list 111 are listed on the display screen 116, the flow transitions through a second return point 318 and moves to a UCD selected state 320. If the operator has not selected a particular channel from the display screen 116, the flow moves back to the second return point 318. This loop of transitioning between the UCD selected state 320 and the second return point 318 will continue as long as the operator has not selected a particular channel from the display screen 116.

If the operator does select a particular channel from the display screen 116, it will be recognized by the UCD selected state 320 and the flow will exit the pause the network state 314 and enter a complete CM registration state 322. The complete CM registration state 322, may verify that the particular channel is still listed in the upstream channel descriptor (UCD) message from the cable modem termination system (CMTS) 202. Once the particular channel is verified, the controller unit 102 may initiate a communication through the transmitter 112, of FIG. 1. When the cable modem termination system (CMTS) 202 receives the communication, it registers the controller unit 102, emulating the interface device 222, on the particular channel selected by the operator and commences communication.

The above flow diagram is by way of an example. Some of the optional states may have been omitted for simplicity and clarity of the description.

Figure 4:
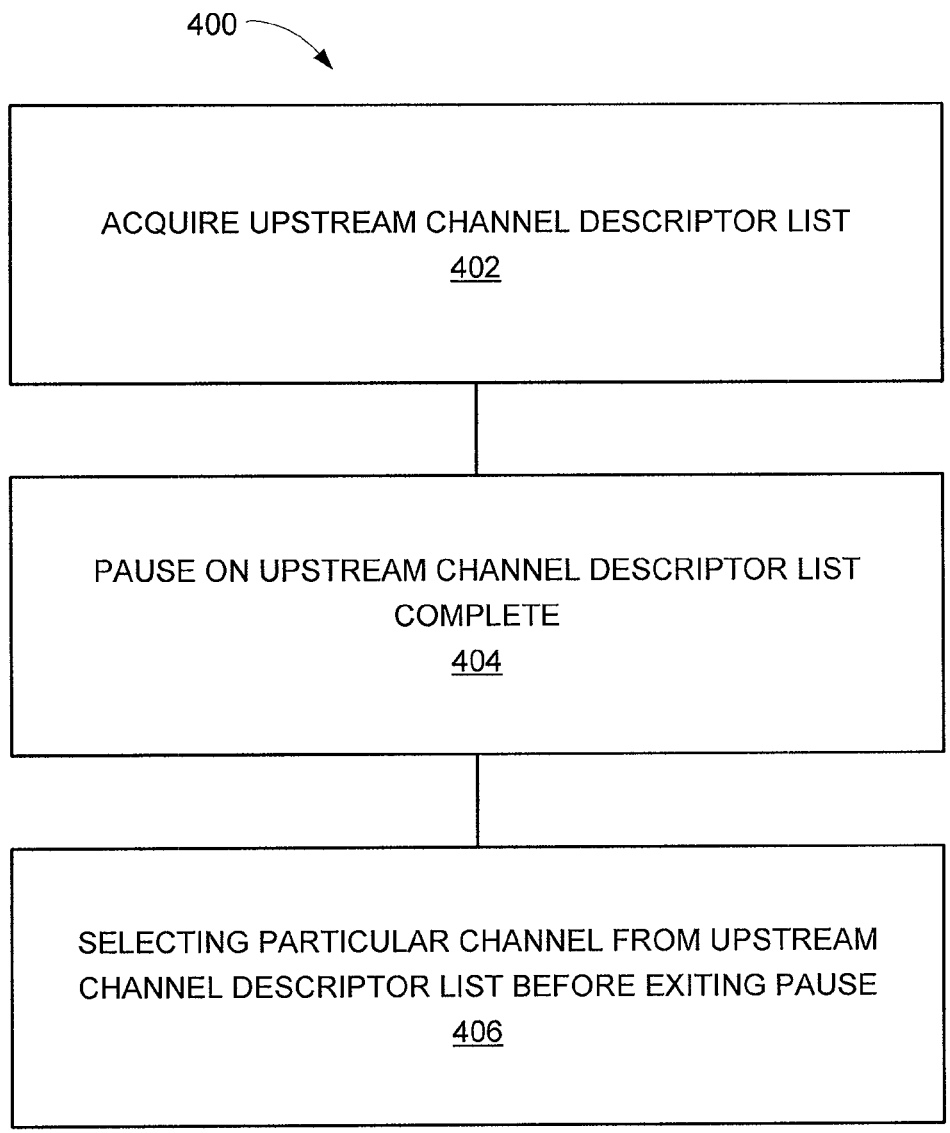
FIG. 4 is a flow chart of a test system with user selectable channel for utilizing the test system with user selectable channel in an embodiment of the present invention.

Referring now to FIG. 4, therein is shown a flow chart of a test system 400 with user selectable channel for utilizing the test system with user selectable channel 100 in an embodiment of the present invention. The system 400 includes acquiring an upstream channel descriptor list in a block 402; entering a pause network state when the upstream channel descriptor list is completed in a block 404; and selecting a particular channel from the upstream channel descriptor list before exiting the pause network state in a block 406.

In greater detail, a system to utilize the test system with user selectable channel, according to an embodiment of the present invention, is performed as follows:
1. Acquiring an upstream channel descriptor list for determining an available channel. (FIG. 3)
2. Entering a pause network state when the upstream channel descriptor list is completed including writing a storage device with the upstream channel descriptor list. (FIG. 3) and
3. Selecting a particular channel from the upstream channel descriptor list before exiting the pause network state including registering on a network with the particular channel. (FIG. 3)

It has been discovered that the present invention thus has numerous aspects.

A principle aspect that has been unexpectedly discovered is that the present invention allows an operator to access a particular channel from the upstream channel descriptor list. This allows testing specific channels at the operator's discretion.

Another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the test system with user selectable channel of the present invention furnishes important and heretofore unknown and unavailable solutions, capabilities, and functional aspects for DOCSIS network testers. The resulting processes and configurations are straightforward, cost-effective, uncomplicated, highly versatile and effective, can be surprisingly and unobviously implemented by adapting known technologies, and are thus readily suited for efficiently and economically manufacturing DOCSIS network tester devices fully compatible with conventional manufacturing processes and technologies. The resulting processes and configurations are straightforward, cost-effective, uncomplicated, highly versatile, accurate, sensitive, and effective, and can be implemented by adapting known components for ready, efficient, and economical manufacturing, application, and utilization.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims. All matters hithertofore set forth herein or shown in the accompanying drawings are to be interpreted in an illustrative and non-limiting sense.

What is claimed is:

1. A method of operating a test system comprising:
acquiring an upstream channel descriptor list;
entering a pause network state, for delaying a cable modem termination system interaction pending operator intervention, when the upstream channel descriptor list is completed; and
selecting a particular channel from the upstream channel descriptor list before exiting the pause network state.

2. The method as claimed in claim 1 further comprising providing a display screen for listing the upstream channel descriptor list.

3. The method as claimed in claim 1 further comprising providing a control panel for selecting the particular channel from the upstream channel descriptor list.

4. The method as claimed in claim 1 further comprising providing a conditioning circuit for selecting the particular channel including:
   adjusting a radio frequency receiver;
   writing a storage device;
   receiving an operator input by a selection button; and
   adjusting a radio frequency transmitter.

5. The method as claimed in claim 1 further comprising:
   providing a controller unit;
   coupling a network to the controller unit;
   providing a cable modem termination system coupled to the network; and
   registering the controller unit, on the particular channel, with the cable modem termination system.

6. A method of operating a test system comprising:
   acquiring an upstream channel descriptor list for determining an available channel;
   entering a pause network state, for delaying a cable modem termination system interaction pending operator intervention, when the upstream channel descriptor list is completed including writing a storage device with the upstream channel descriptor list; and
   selecting a particular channel from the upstream channel descriptor list before exiting the pause network state including registering on a network with the particular channel.

7. The method as claimed in claim 6 further comprising providing a display screen for listing the upstream channel descriptor list including providing a conditioning circuit for moving the upstream channel descriptor list from the storage device to the display screen.

8. The method as claimed in claim 6 further comprising providing a control panel for selecting the particular channel from the upstream channel descriptor list including providing a positioning button for identifying the particular channel.

9. The method as claimed in claim 6 further comprising providing a conditioning circuit for selecting the particular channel including:
   adjusting a radio frequency receiver including detecting an upstream channel descriptor message from the network;
   writing the storage device for storing the upstream channel descriptor list;
   receiving an operator input by a selection button including activating a control panel; and
   adjusting a radio frequency transmitter for registering on the network.

10. The method as claimed in claim 6 further comprising:
    providing a controller unit for analyzing the network;
    coupling the network to the controller unit including coupling an interface device;
    providing a cable modem termination system coupled to the network for communicating with the controller unit, the interface device, or a combination thereof; and
    registering the controller unit, on the particular channel, with the cable modem termination system including completing a ranging request on the network.

11. A test system comprising:
    a controller unit;
    a cable modem termination system coupled to the controller unit for sending an upstream channel descriptor list; and
    a conditioning circuit in the controller unit for delaying interaction of the cable modem termination system includes a particular channel from the upstream channel descriptor list selected by an operator.

12. The system as claimed in claim 11 further comprising a display screen in the controller unit for showing the upstream channel descriptor list.

13. The system as claimed in claim 11 further comprising a control panel on the controller unit for selecting the particular channel from the upstream channel descriptor list.

14. The system as claimed in claim 11 wherein the controller unit having a conditioning circuit includes:
    a radio frequency receiver coupled to the conditioning circuit;
    a storage device coupled to the conditioning circuit; and
    a radio frequency transmitter coupled to the conditioning circuit.

15. The system as claimed in claim 11 further comprising a network coupled between the controller unit and the cable modem termination system.

16. The system as claimed in claim 11 further comprising a storage device in the controller unit coupled to the conditioning circuit.

17. The system as claimed in claim 16 further comprising a display screen in the controller unit for showing the upstream channel descriptor list includes the upstream channel descriptor list copied from the storage device to the display screen.

18. The system as claimed in claim 16 further comprising a control panel for selecting the particular channel from the upstream channel descriptor list includes a positioning button and a selection button.

19. The system as claimed in claim 16 wherein the controller unit having a conditioning circuit includes:
    a network coupled between the controller unit and the cable modem termination system;
    a radio frequency receiver coupled to the conditioning circuit for detecting an upstream channel descriptor message; and
    a radio frequency transmitter adjusted for registering on the network.

20. The system as claimed in claim 16 further comprising:
    a network coupled between the controller unit and the cable modem termination system; and
    an interface device coupled to the network for communicating with the cable modem termination system.

* * * * *